United States Patent
Malone et al.

(10) Patent No.: US 9,499,195 B2
(45) Date of Patent: Nov. 22, 2016

(54) INTEGRATION OF STOP-START AND ACTIVE FRONT STEERING

(71) Applicant: Ford Global Technologies, LLC, Dearborn, MI (US)

(72) Inventors: Mark Douglas Malone, Canton, MI (US); William Najib Mansur, West Bloomfield, MI (US); Attila Benak, Cologne (DE); Lodewijk Wijffels, Canton, MI (US); Oliver Nehls, Dusseldorf (DE)

(73) Assignee: Ford Global Technologies, LLC, Dearborn, MI (US)

( * ) Notice: Subject to any disclaimer, the term of this patent is extended or adjusted under 35 U.S.C. 154(b) by 24 days.

(21) Appl. No.: 14/596,366

(22) Filed: Jan. 14, 2015

(65) Prior Publication Data

US 2016/0200351 A1    Jul. 14, 2016

(51) Int. Cl.
*B62D 5/04* (2006.01)
*B62D 5/00* (2006.01)

(52) U.S. Cl.
CPC ............... *B62D 5/046* (2013.01); *B62D 5/008* (2013.01)

(58) Field of Classification Search
CPC .............................. B62D 5/046; B62D 5/008
See application file for complete search history.

(56) References Cited

U.S. PATENT DOCUMENTS

| | | | |
|---|---|---|---|
| 7,065,437 B2 | 6/2006 | Mir et al. | |
| 7,634,340 B2 | 12/2009 | Katrak et al. | |
| 8,170,750 B2 | 5/2012 | Katrak et al. | |
| 8,418,801 B2 * | 4/2013 | Izutani | B62D 5/0481 180/446 |
| 2008/0065292 A1 | 3/2008 | Katrak et al. | |
| 2012/0101686 A1 * | 4/2012 | Kumano | B60R 25/02 701/42 |
| 2012/0330508 A1 * | 12/2012 | Pebley | B62D 5/0481 701/41 |
| 2013/0001006 A1 * | 1/2013 | Gibson | B62D 5/0481 180/446 |
| 2013/0066507 A1 * | 3/2013 | Yamane | B60R 16/0232 701/22 |
| 2013/0158806 A1 | 6/2013 | Sugiyama et al. | |
| 2013/0253766 A1 * | 9/2013 | Kimura | B62D 5/0463 701/41 |
| 2013/0319164 A1 * | 12/2013 | Inoue | B62D 1/16 74/495 |

* cited by examiner

*Primary Examiner* — Rodney Butler
*Assistant Examiner* — Frederick Brushaber
(74) *Attorney, Agent, or Firm* — Frank MacKenzie; Brooks Kushman P.C.

(57) ABSTRACT

A vehicle includes an engine configured to auto stop and auto start. The vehicle includes an active front steering system with an electric actuator. A controller operates the electric actuator at a current limit that is less than a requested current of the electric actuator in response to a request to change a steering ratio by an amount that results in the requested current being greater than the current limit during an engine auto stop event. The current limit may decrease from the requested current to a predetermined limit after transitioning to the engine auto stop event. The current limit may increase from the predetermined limit to the requested current after transitioning from the engine auto stop event.

20 Claims, 3 Drawing Sheets

INTEGRATION OF STOP-START AND ACTIVE FRONT STEERING

TECHNICAL FIELD

This application generally relates to the integration of engine start-stop and active front steering systems in a vehicle.

BACKGROUND

A micro-hybrid or start/stop vehicle can selectively turn its engine off during portions of a drive cycle to conserve fuel. As an example, a stop/start vehicle can turns its engine off while the vehicle is stopped rather than allow the engine to idle. The engine can then be restarted, for example, when a driver steps on the accelerator pedal. The start/stop vehicle may also include an active front steering system that varies a gear ratio at which the wheels turn in response to rotation of a steering wheel.

SUMMARY

An active front steering system includes an electric actuator coupled to a steering mechanism and at least one controller. The at least one controller is programmed to, in response to a request to change a steering ratio by an amount that results in a requested current of the electric actuator being greater than a predetermined current in a presence of an input indicative of an engine auto stop event, operate the electric actuator at the predetermined current. The at least one controller may be further programmed to, in response to a request to change the steering ratio by the amount that results in the requested current of the electric actuator being greater than the predetermined current in a presence of an input indicative of an engine running, operate the electric actuator at the requested current. The active front steering system may further include a locking mechanism cooperating with the electric actuator, and the at least one controller may be further programmed to, in response to the input indicative of the engine auto stop event, operate the locking mechanism in a locked mode to prevent the electric actuator from affecting operation of the steering mechanism. The predetermined current may decrease toward a limit current in response to an input indicative of preparation for an engine auto stop. The predetermined current may increase toward the requested current in response to an input indicative of an engine speed increasing. The at least one controller may be further programmed to, in response to the request to change the steering ratio by the amount that results in the requested current of the electric actuator being greater than the predetermined current and an input indicative of no electrical power being generated to support the electric actuator, operate the electric actuator at the predetermined current. The electric actuator may be an electric motor.

A vehicle includes an engine configured to auto stop and auto start, an active front steering system including an electric actuator, and at least one controller. The at least one controller is programmed to, in response to a request to change a steering ratio by an amount that results in a requested current of the electric actuator being greater than a predetermined current during an engine auto stop event, operate the electric actuator at the predetermined current. The predetermined current may be decreased to a predetermined limit current before fuel to the engine is shut off. The at least one controller may be further programmed to, in response to the request to change the steering ratio by the amount that results in the requested current of the electric actuator being greater than the predetermined current while the engine is running, operate the electric actuator at the requested current. The predetermined current may increase in response to fuel being provided to the engine. The vehicle may further include an electric machine coupled to the engine, and the at least one controller may be further programmed to, in response to the electric machine operating as a generator and generating current at least equal to the requested current, operate the electric actuator at the requested current. The active front steering system may further include a locking mechanism cooperating with the electric actuator, and the at least one controller may be further programmed to actuate the locking mechanism to operate the active front steering system in a locked mode during the engine auto stop event. The predetermined current may be ramped down to a predetermined limit current after transitioning to the engine auto stop event. The predetermined current may be ramped up to the requested current after transitioning from the engine auto stop event.

A method includes receiving, by a controller, an input indicative of a state of an engine start-stop system. The method further includes requesting, by the controller, a demand current for actuating an electric actuator to achieve a steering ratio that is based on a steering request. The method further includes operating, by the controller, the electric actuator at a limit current that is less than the demand current in response to the state indicating an auto-stop event. The method may further include increasing, by the controller, the limit current to the demand current over a predetermined time interval in response to the state indicating that engine speed is increasing. The method may further include operating, by the controller, the electric actuator at the demand current in response to the state indicating an engine running state. The method may further include decreasing, by the controller, the limit current to a minimum limit over a predetermined time interval in response to the state indicating preparation for engine auto-stop. The method may further include outputting, by the controller, a status indicator when the electric actuator is operated at the limit current.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
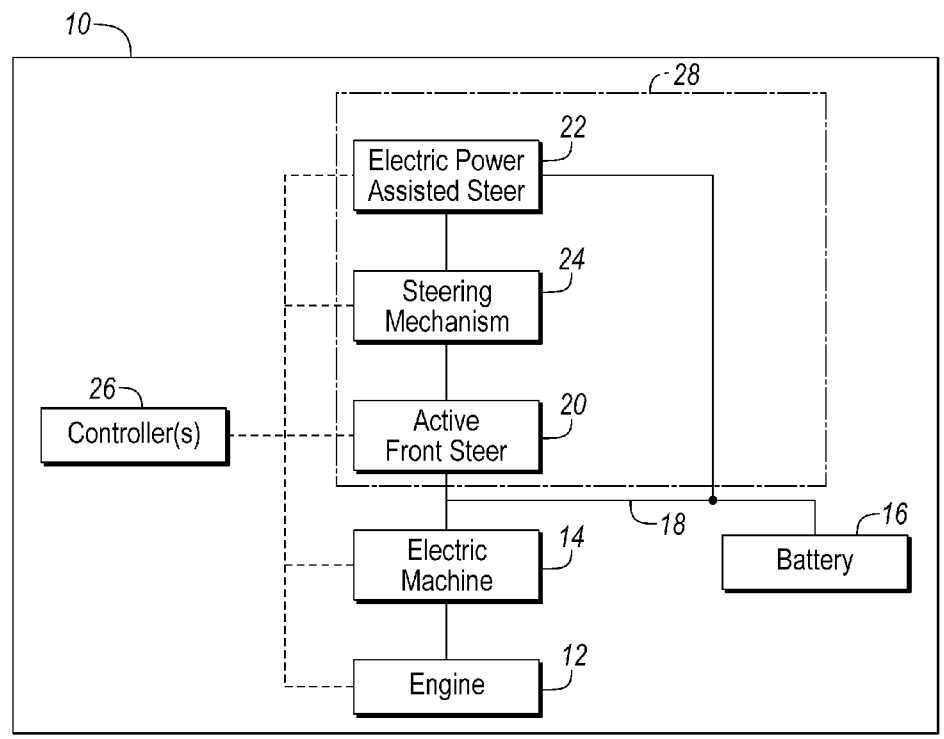
FIG. 1 is a diagram of an exemplary stop/start vehicle illustrating typical components.

FIG. 1 depicts an exemplary block diagram of a vehicle. A vehicle 10 may include an engine 12 for powering the vehicle 10. The engine 12 may be mechanically coupled to an electric machine 14. The electric machine 14 may function as an alternator and a starter. When operating as a starter, the electric machine 14 may receive electrical power from a battery 16 over a power network 18. The electric machine 14 may convert the electrical power into mechanical rotation to spin the engine 12 to start the engine 12.

When operating as an alternator or generator, the electric machine 14 may convert mechanical energy from rotation of the engine 12 into electrical energy on the power network 18. The electrical energy may be stored in the battery 16 or utilized by electrical components coupled to the power network 18.

The vehicle 10 may include a steering system 28 that includes a steering mechanism 24 coupled to front wheels of the vehicle 10. The steering system 28 may include an Active Front Steering (AFS) module 20. The AFS module 20 may assist in driving the steering mechanism 24 to vary a gear ratio at which the wheels turn in response to rotation of a steering wheel. For example, at lower vehicle speeds, a high gear ratio may be implemented such that the steering wheel is turned less for a given steering angle. This allows for sharp turns to be made with less steering wheel input. At higher vehicle speeds, the gear ratio may be reduced such that the steering wheel is turned more for a given steering angle. This reduces the sensitivity of the steering system 28 to changes in the steering wheel at higher speeds. The net effect is that, at higher speeds, the wheels turn less in response to rotation of the steering wheel.

The steering system 28 may include an Electric Power Assisted Steering (EPAS) module 22 that may work in conjunction with the steering mechanism 24. The EPAS module 22 may assist in driving the steering mechanism 24 to reduce the amount of operator effort required to steer the vehicle 10. The EPAS module 22 may include an electric motor that assists driving the steering mechanism 24. The EPAS module 22 may add torque, in addition to the torque provided by the operator, to change the direction of the front wheels.

The AFS module 20 and the EPAS module 22 may be electrically coupled to the power network 18. Power may be provided by energy stored in the battery 16. The electric machine 14 may also provide power when operating as a generator. The AFS module 20 and the EPAS module 22 may communicate with one or more controllers 26 in the vehicle.

The vehicle may include one or more controllers 26 to coordinate and manage the operation of the various components. The one or more controllers 26 may interface with the various devices via hardwired signals or serial communications bus (e.g., Controller Area Network (CAN)). The controllers 26 may include a microprocessor and non-volatile memory for storing data when the controllers 26 are powered down.

The engine 12 may be configured to auto stop and auto start. During vehicle operation, the engine may be stopped and started during an ignition cycle. Conditions may be monitored to determine when to auto stop the engine 12 to improve fuel economy. Conditions are also monitored to determine when to auto start the engine 12.

Figure 3:
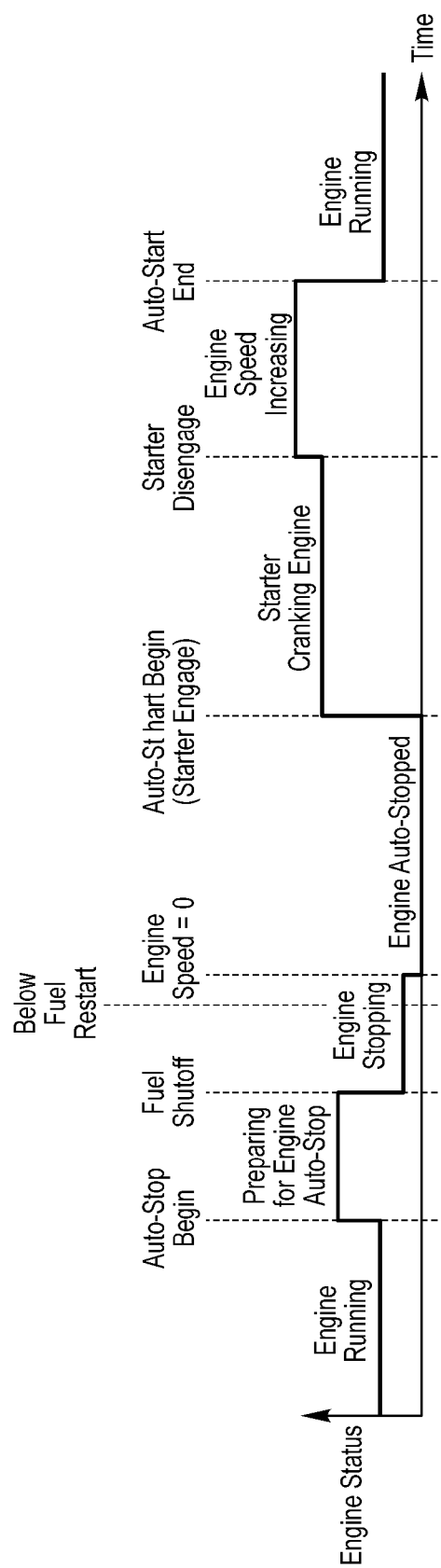
FIG. 3 is a plot illustrating engine status during an auto-stop event.

With reference to FIG. 3, an engine stop/start sequence may include several stages: "auto-stop begin," which marks the beginning of the engine auto-stop; "preparing for engine auto-stop," which is the time period during which vehicle systems as well as the engine are prepared for the impending engine stop (if an auto stop inhibit condition is detected during this stage, the preparation for the impending engine stop is discontinued and the vehicle systems and engine are returned to their normal operating modes); "fuel shutoff," which marks the point at which fuel flow to the engine is stopped; "engine stopping," which is the time period during which the engine speed is reduced to zero; "below fuel restart," which marks the point after which if a restart is requested to inhibit the auto stop during the "engine stopping" stage, the starter may need to be engaged to crank the engine (if a restart is requested before "below fuel restart" and during the "engine stopping" stage, the engine may be restarted to inhibit the auto stop by turning the flow of fuel back on); "engine speed=0," which marks the point at which the engine speed is near or equal to 0; "engine auto-stopped," which is the time period during which the engine is off; "starter engage," which marks the point at which the starter starts to crank the engine in an effort to start the engine (in response to detecting an engine auto-start condition); "starter cranking engine," which is the time period during which the engine is unable to crank under its own power; "starter disengage," which marks the point at which the engine is able to crank under its own power; "engine speed increasing," which is the time period during which the speed of the engine increases to its running speed; and, "auto-start end," which marks the point at which the speed of the engine achieves its running speed (a speed at or above target idle speed). An engine auto-stop event may include all stages from "auto-stop begin" through "auto-start end."

Figure 2:
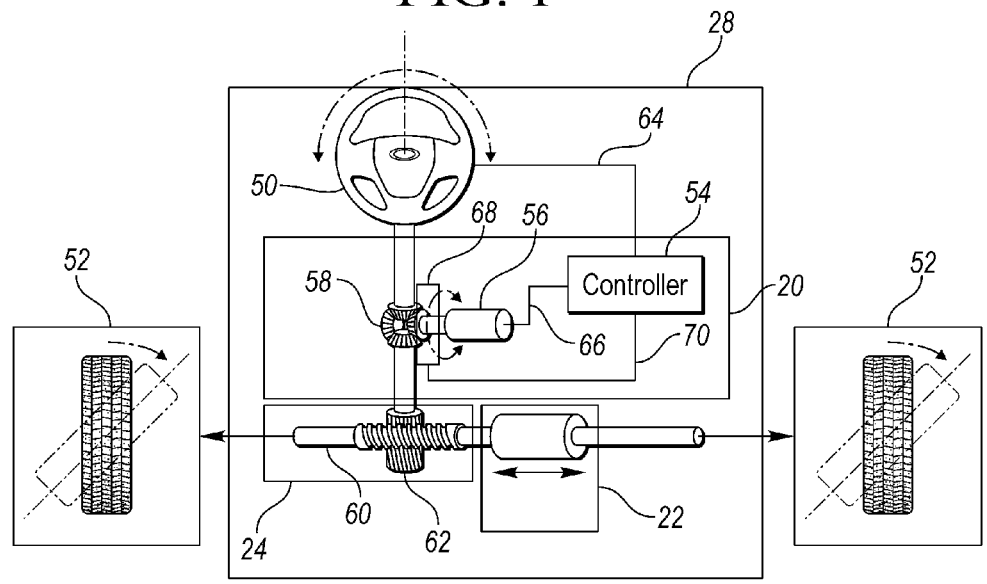
FIG. 2 is a diagram of an exemplary steering system that includes active front steering.

FIG. 2 depicts a diagram of an exemplary steering system 28. The steering system 28 may be configured to steer the vehicle 10 in a direction desired by an operator. The steering system 28 may include a steering wheel 50 that is operated by the operator. The steering system 28 may convert the steering wheel 50 motion into a displacement of the front wheels 52 to cause a change in direction of the vehicle 10. The steering mechanism 24 may be a rack 60 and pinion 62 configuration in which the front wheels 52 are coupled to the rack 60 and the steering wheel 50 is coupled to the pinion 62.

The AFS module 20 may include an electric actuator or electric machine 56 coupled to a differential or planetary gear set 58. The electric machine 56 may cause the pinion 62 to rotate which may cause the rack 60 to move and cause the front wheels 52 to change direction. The steering wheel 50 may be coupled through the AFS gear set 58 as well. A variable gear ratio between the steering wheel 50 and the wheels 52 may be caused by operating the AFS module 20 to drive the pinion 62 as the steering wheel 50 is turned. The gear ratio may be a ratio between the steering wheel angle and an angle at which the wheels turn (e.g., a wheel steer angle). A controller 54 may receive a steering wheel angle input signal 64 indicative of a position of the steering wheel 50 and may produce one or more output signals 66 to operate the electric machine 56. Additional inputs and outputs may be utilized by the controller 54. The controller 54 may communicate with other controllers, such as an engine controller or a vehicle system controller.

The controller 54 may be programmed to monitor the steering wheel angle input signal 64 from the steering wheel 50. A steering ratio may be determined based on the steering wheel angle and the vehicle speed. Based on the steering ratio, the controller 54 may determine a demand current for the electric machine 56. The controller 54 may control the current through the electric machine 56 via the output signals 66.

The AFS module 20 may include a locking mechanism 68. The locking mechanism 68 may be a solenoid actuated device that, when actuated, prevents the electric machine 56 from rotating the pinion 62. When the locking mechanism 68 is engaged, the AFS module 20 cannot assist in steering the vehicle and steering is accomplished using the steering wheel 50 output. The locking mechanism 68 may be controlled by an output signal 70 from the controller 54.

The EPAS 22 and AFS 20 modules are coupled to the power network 18 and derive electrical power from the electric machine 14 or the battery 16. During operation, the EPAS 22 and AFS 20 modules may draw a significant amount of current from the power network 18. Under conditions in which the engine 12 is running and the electric machine 14 is supplying electrical power to the power network 18, the energy stored in the battery 16 may not be depleted. However, when the engine 12 is not running, electrical power is provided by the battery 16. The result may be a drop in voltage of the power network 18 which may negatively impact the EPAS 22 or AFS 20 modules. For example, the voltage may drop low enough so that the EPAS 22 or AFS 20 modules cannot function adequately.

Another issue is that while the EPAS 22 and AFS 20 are drawing current, a decision may be made to restart the engine 12 using the electric machine 14. Using the electric machine 14 to start the engine causes an increase in current draw from the battery 16 which may lead to a further voltage drop. The result is that the electric machine 14 may not receive enough power to start the engine 12. This is an undesirable situation as the operator may not have propulsion when it is demanded.

To resolve these issues, it may be beneficial to manage the power demands of the EPAS module 22 and AFS module 20 during engine start-stop events. The maximum current draw of the AFS module 20 may be limited to a predetermined threshold during start-stop events. For example, during an engine auto-stop event, the maximum current drawn by the AFS module 20 may be limited to 5 Amps. The current may remain limited until an engine restart occurs and the power network voltage returns to normal operating levels.

The voltage drop of the battery 16 may be monitored during the engine auto-stop event. During an engine auto-stop event, the voltage of the battery 16 may decrease as the electric machine 14 may no longer provide power to the power network 18. The voltage of the battery 16 may drop to a minimum calibrateable threshold.

The EPAS module 22 may be operated in a limited mode during engine auto-stop events. The EPAS module may be configured to provide no assistance during engine auto-stop events. Alternatively, the EPAS assist may operate with reduced capability during the engine auto-stop event. The EPAS module 22 may be operated such that the maximum current draw of the EPAS module 22 is less than a predetermined threshold during engine auto-stop events. The resulting vehicle affect is that the operator torque required to steer the vehicle is increased during engine auto-stop events.

Figure 4:
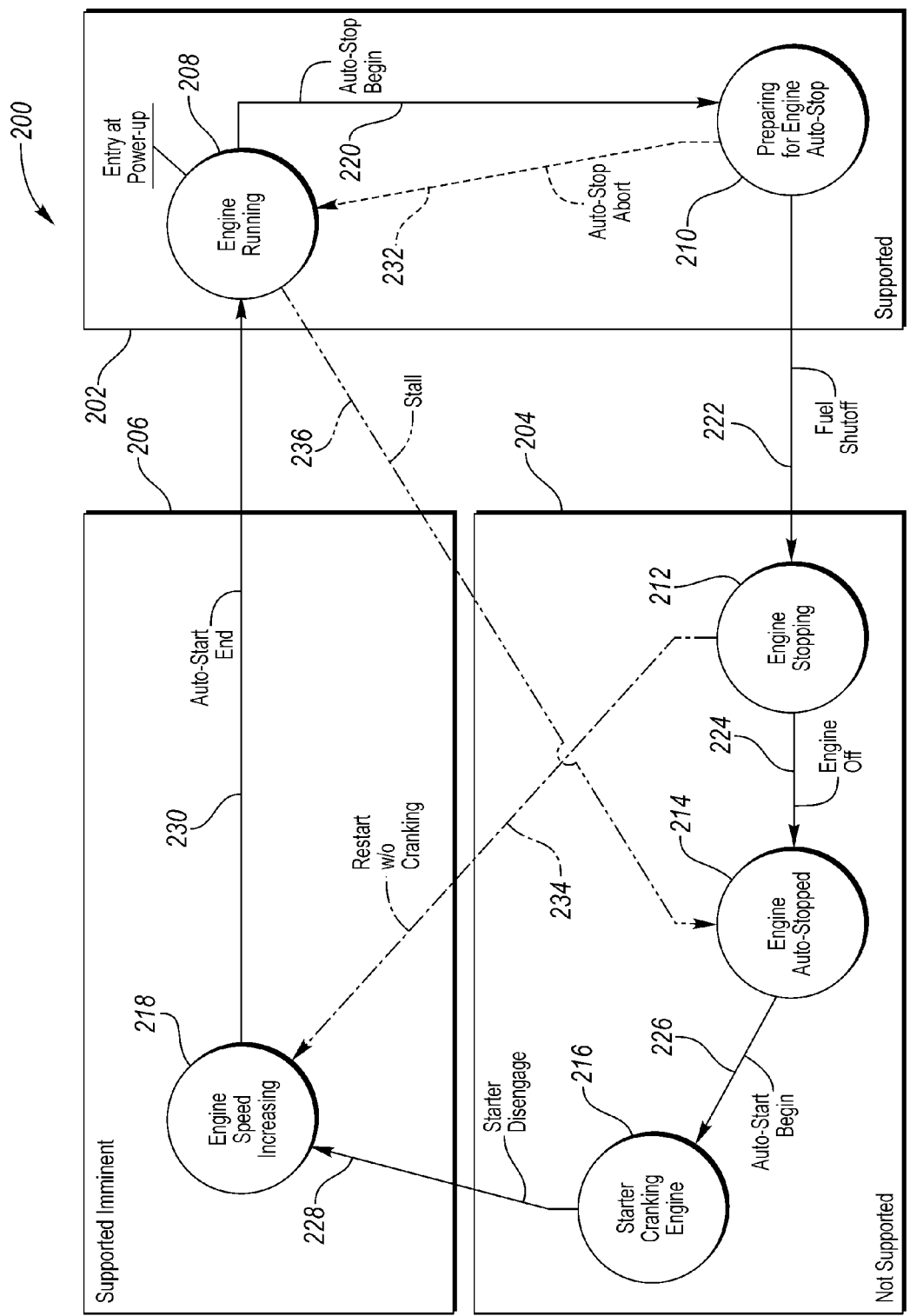
FIG. 4 is a state transition diagram of exemplary states and transitions for an active front steering system in a vehicle with engine start-stop capability.

The operation of the AFS system 20 may be based on an operational status or state of the engine start-stop system. The operational state of the engine start-stop system may be broadcast to the controllers over the communication link. The engine start-stop system may operate in one or more distinct states or stages that may affect the operation of the AFS system 20. FIG. 4 depicts an exemplary state diagram 200 showing possible states of an active front steering system related to state transitions and operational modes of an engine start-stop system.

The controller 54 may operate the electric actuator 56 based on a request to change the steering ratio. In response to a request to change the steering ratio, the controller 54 may determine a demand current for the electric actuator 56. Other inputs such as vehicle speed may also be used to determine the demand current. The controller 54 may then cause a current with a magnitude of the demand current to flow through the electric actuator 56. The mode of operation of the AFS system may be based on the state of the engine start/stop system. The controller 54 may receive an input that is indicative of an engine auto stop event.

The state diagram 200 may include operational states (208-218) for the engine start-stop system and corresponding modes of operation (202-206) for the AFS system 20. The mode of operation (202-206) of the AFS system 20 may be based on the present operational state (208-218) of the engine start-stop system. Operation of the AFS system 20 may be in a supported mode 202 when the operational state of the engine start-stop system is Engine Running 208 or Preparing For Engine Auto-Stop 210. In the supported mode 202, the AFS system 20 may be fully operational and allowed to draw the full demand current from the power network 18. The electric actuator 56 may be operated at the demand current in the supported mode 202.

Operation of the AFS system 20 may be in an unsupported or not supported mode 204 when the operational state of the engine start-stop system is Engine Stopping 212, Engine Auto-Stopped 214, or Starter Cranking Engine 216. In the unsupported mode 204, the AFS system 20 may be current limited and the AFS actuator 56 may be locked or held. When the AFS system is operating in the unsupported mode 204, the maximum allowed current of the electric actuator 56 may be limited by the controller 54 to be no greater than a predetermined current. In this mode, when the steering request causes a demand current that is greater than the predetermined current, the current may be limited to the predetermined current. If the demand current is less than the predetermined current, then the electric actuator 56 may be operated at the demand current. In this mode, the controller 54 may activate the locking mechanism 68 to limit the impact of the electric actuator 56. During an engine auto-stop event, the AFS system 20 may deliver reduced performance and will not prevent an engine restart.

Operation of the AFS system 20 may be in a supported imminent mode 206 when the operational state of the engine start-stop system is Engine Speed Increasing 218. In the supported imminent mode 206, limited operation of the AFS system 20 may be allowed. The controller 54 may limit the current to the electric actuator 56 to be no greater than a predetermined current. In this mode, the predetermined current may be increased toward the demand current.

When the engine 12 is operating in a running condition, the engine start-stop state may be in the Engine Running state 208. In the Engine Running state 208, various Auto-Stop Begin conditions 220 may be monitored for transitioning to an engine auto-stop. The engine start-stop system may transition to the Preparing for Engine Auto-Stop state 210 when the Auto-Stop Begin conditions 220 are satisfied. The Auto-Stop Begin conditions 220 may be based on an accelerator pedal position, a vehicle speed, and a brake pedal position. Other inputs may also affect the Auto-Stop Begin conditions 220. For example, the Auto-Stop Begin conditions 220 may be satisfied when the accelerator pedal position is less than a threshold or when the brake pedal position is above a threshold.

In the Preparing for Engine Auto-Stop state 210, the controller 26 may perform operations to ready the system for engine shut down. During the Preparing for Engine Auto-Stop state 210, the AFS system 20 may be allowed to operate. The controller 54 may limit the current to the electric actuator 56 to be no greater than the predetermined current. The predetermined current for the electric actuator 56 may be ramped down from the demand current to a predetermined limit value (e.g., 5 Amps). The Preparing for Engine Auto-Stop state 210 may transition to the Engine Stopping state 212 when certain Fuel Shutoff conditions 222 are satisfied. For example, the Fuel Shutoff conditions 222 may include the engine speed being less than a predetermined speed.

In the Engine Stopping state 212, the controller 26 may perform operations to bring the engine to a complete shutdown. Operations that may be performed may be to operate the electric machine 14 to reduce the engine speed. The engine speed may be monitored to detect when the engine 12 is off. During the Engine Stopping state 212, the AFS system 20 may be in the not supported mode 204. The Engine Stopping state 212 may transition to the Engine Auto-Stopped 214 state when certain Engine Off conditions 224 are satisfied. The Engine Off conditions 224 may include the engine speed being approximately zero.

In the Engine Auto-Stopped state 214, the controller 26 may perform operations to monitor for engine restart. For example, inputs such as the accelerator pedal position and the brake pedal position may be monitored to determine when the engine 12 should be restarted. During the Engine Auto-Stopped state 214, the AFS system 20 may be in the not supported mode 204. When Auto-Start Begin conditions 226 are detected, the engine start-stop system may transition to the Starter Cranking Engine state 216.

In the Starter Cranking Engine state 216, the controller 26 may perform operations to re-crank the engine. The electric machine 14 may draw power from the battery 16 to rotate the engine 12. The speed of the engine 12 may increase during this state. During the Starter Cranking Engine state 216, the AFS system 20 may be in the not supported mode 204. The Starter Cranking Engine state 216 may transition to the Engine Speed Increasing state 218 when certain Starter Disengage conditions 228 are satisfied. The Starter Disengage conditions 228 may include when the engine speed has increased to greater than a predetermined speed.

In the Engine Speed Increasing state 218, the controller 26 may perform operations to operate the engine 12 and related systems. During this state, the engine speed may be increasing or may be controlled to a predetermined idle speed. The controller 26 may cause an injection of fuel and cause spark in the engine 12 to initiate combustion. The engine 12 may begin operating and the engine speed may change to reach an idle speed. During the Engine Speed Increasing state 218, the AFS current limit may be ramped up to the normal operating limit value or the demand current. During the Engine Speed Increasing state 218, the AFS system 20 may be in the supported imminent mode 206. The Engine Speed Increasing state 218 may transition to the Engine Running state 208 when certain Auto-Start End conditions 230 are satisfied. The Auto-Start End conditions 230 may include that the alternator 14 is ready. The Auto-Start End conditions 230 may be determined from the status of the electric machine 14. The Auto-Start End conditions 230 may be satisfied when the electric machine 14 is operating as a generator and supplying energy to the power network 18. Note that in the Engine Speed Increasing state 218, the electric machine 14 may transition from operating as a motor (starter function) to a generator (alternator function).

Other paths through the states are possible. For example, there may be situations during an engine start-stop event in which the state flow may be altered. These situations may be described as "change of mind" situations. For example, during an engine start-stop event, it may be determined that the engine should be restarted before the engine is completely shut off. An engine auto stop event may include operations from stopping the engine until the subsequent restarting of the engine.

A first change of mind situation may occur when the system is in Preparing for Engine Auto-Stop state 210. Auto-stop Abort conditions 232 may be present that cause a transition back to the Engine Running state 208. These conditions may include a release of the brake pedal or application of the accelerator pedal. In these situations, the system may transition back to the Engine Running state 208 as fuel is still being provided to the engine 12.

A second change of mind situation may occur when the engine start-stop event is aborted during the Engine Stopping state 212 while the engine speed is ramping down before the Engine Off conditions 224 are satisfied. The system may transition to the Engine Speed Increasing state 218 from the Engine Stopping state 212 when certain Restart Without Cranking conditions 234 are satisfied. The Restart Without Cranking conditions 234 may include a release of the brake pedal or an increase in the accelerator position indicative of a desire for propulsion.

A third change of mind situation may occur due to an engine stall. This situation may cause a transition from the Engine Running state 208 to the Engine Auto-Stopped state 214 based on stall conditions 236. The stall conditions 236 may include the engine speed being below a predetermined threshold that indicates that the engine 12 has stalled. In a vehicle having a manual transmission, the engine 12 may stall due to improper operator clutch control or gear selection. In a vehicle having an automatic transmission, an engine 12 stall may be due to a system error that causes improper engine 12 or transmission operation.

The vehicle may also include an operator interface for communicating status information to the operator. The operator interface may include lights, gauges, displays, or other indicators to indicate the status of vehicle functions. For example, a lamp or display message may be configured to indicate when the EPAS or AFS system is operating in a limited mode. The lamp or display message may be activated when the EPAS or AFS system operation are requested during an engine auto-stop event in which the EPAS or AFS system are operating in a reduced performance mode (e.g., limited current operation). The operator interface may include a switch or button to override the reduced performance mode. For example, when the switch or button is pressed, the EPAS or AFS system may return to normal operation (e.g., current no longer limited). Other configurations may include a display interface that permits the operator to enable and disable the reduced performance mode of the EPAS and AFS systems.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An active front steering system comprising:
   an electric actuator coupled to a steering mechanism for adjusting a steering ratio; and
   a controller programmed to, in response to a request to change the steering ratio by an amount that results in a requested current of the electric actuator being greater than a predetermined current in a presence of an input indicative of an engine auto stop event, operate the electric actuator at the predetermined current.

2. The active front steering system of claim 1 wherein the at least one controller is further programmed to, in response to a request to change the steering ratio by the amount that results in the requested current of the electric actuator being greater than the predetermined current in a presence of an input indicative of an engine running, operate the electric actuator at the requested current.

3. The active front steering system of claim 1 further comprising a locking mechanism cooperating with the electric actuator, and wherein the at least one controller is further programmed to, in response to the input indicative of the engine auto stop event, operate the locking mechanism in a locked mode to prevent the electric actuator from changing the steering ratio of the steering mechanism.

4. The active front steering system of claim 1 wherein the predetermined current decreases toward a limit current in response to an input indicative of preparation for an engine auto stop.

5. The active front steering system of claim 1 wherein the predetermined current increases toward the requested current in response to an input indicative of an engine speed increasing.

6. The active front steering system of claim 1 wherein the at least one controller is further programmed to, in response to the request to change the steering ratio by the amount that results in the requested current of the electric actuator being greater than the predetermined current and an input indicative of no electrical power being generated to support the electric actuator, operate the electric actuator at the predetermined current.

7. The active front steering system of claim 1 wherein the electric actuator is an electric motor.

8. A vehicle comprising:
   an engine configured to auto stop and auto start;
   an active front steering system including an electric actuator; and
   at least one controller programmed to, in response to a request to change a steering ratio by an amount that results in a requested current of the electric actuator being greater than a predetermined current during an engine auto stop event, operate the electric actuator at the predetermined current.

9. The vehicle of claim 8 wherein the predetermined current is decreased to a predetermined limit current before fuel to the engine is shut off.

10. The vehicle of claim 8 wherein the at least one controller is further programmed to, in response to the request to change the steering ratio by the amount that results in the requested current of the electric actuator being greater than the predetermined current while the engine is running, operate the electric actuator at the requested current.

11. The vehicle of claim 8 wherein the predetermined current is increased in response to fuel being provided to the engine.

12. The vehicle of claim 8 further comprising an electric machine coupled to the engine, wherein the at least one controller is further programmed to, in response to the electric machine operating as a generator and generating current at least equal to the requested current, operate the electric actuator at the requested current.

13. The vehicle of claim 8 wherein the active front steering system further includes a locking mechanism cooperating with the electric actuator, and wherein the at least one controller is further programmed to actuate the locking mechanism to operate the active front steering system in a locked mode to prevent changes to the steering ratio during the engine auto stop event.

14. The vehicle of claim 8 wherein the predetermined current is ramped down to a predetermined limit current after transitioning to the engine auto stop event.

15. The vehicle of claim 8 wherein the predetermined current is ramped up to the requested current after transitioning from the engine auto stop event.

16. A method comprising:
   receiving, by a controller, an input indicative of a state of an engine start-stop system,
   requesting, by the controller, a demand current for actuating an electric actuator to achieve a steering ratio that is based on a steering request; and
   operating, by the controller, the electric actuator at a limit current that is less than the demand current in response to the state indicating an engine auto-stop event.

17. The method of claim 16 further comprising increasing, by the controller, the limit current to the demand current over a predetermined time interval in response to the state indicating that engine speed is increasing.

18. The method of claim 16 further comprising operating, by the controller, the electric actuator at the demand current in response to the state indicating an engine running state.

19. The method of claim 16 further comprising decreasing, by the controller, the limit current to a minimum limit over a predetermined time interval in response to the state indicating preparation for engine auto-stop.

20. The method of claim 16 further comprising outputting, by the controller, a status indicator when the electric actuator is operated at the limit current.

* * * * *